Aug. 24, 1926.

J. H. WAGENHORST 1,597,225

METHOD OF MAKING SHEET METAL SPOKES FOR WHEELS

Original Filed Dec. 5, 1918

Inventor
J H Wagenhorst
By
Kuu Brock & West
Attys.

Patented Aug. 24, 1926.

1,597,225

UNITED STATES PATENT OFFICE.

JAMES H. WAGENHORST, OF JACKSON, MICHIGAN.

METHOD OF MAKING SHEET METAL SPOKES FOR WHEELS.

Original application filed December 5, 1918, Serial No. 265,403. Divided and this application filed October 15, 1923. Serial No. 668,534.

This invention relates to the method of making sheet metal spokes for wheels and this application is a division of the application covering metal wheels filed December 5, 1918, Serial No. 265,403.

The object of the present invention is to provide a strong and durable sheet metal spoke which can be quickly and easily assembled into a wheel structure and maintained as a rigid part thereof and another object of the invention is to provide a simple and inexpensive method of making the aforesaid sheet metal spoke.

With these objects in view the invention consists in the novel features of construction and in the novel steps hereinafter fully described and set forth in the appended claim.

Figure 1:
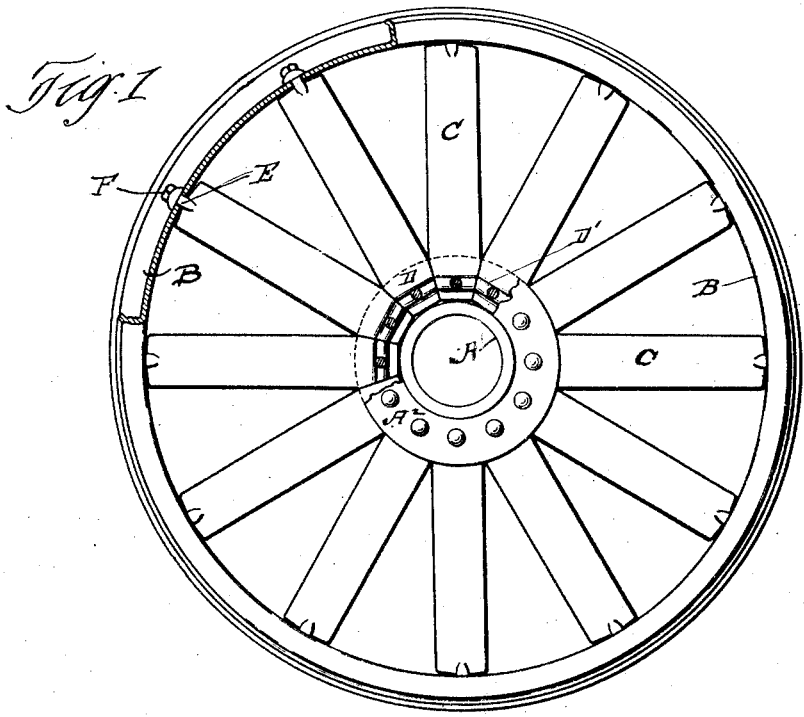
Figure 2:
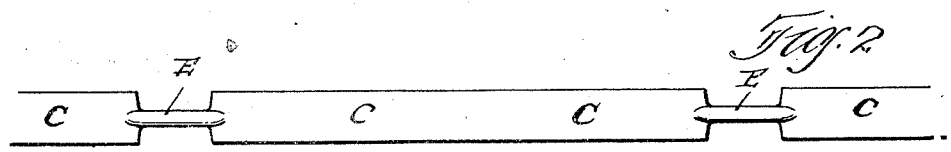
Figure 3:
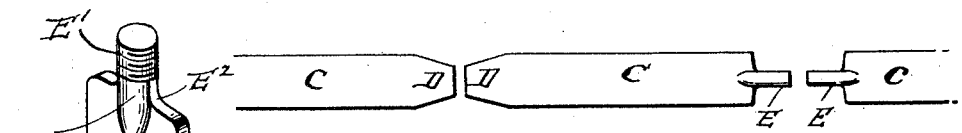
Figure 4:

In the drawing forming a part of this specification Fig. 1 is a side elevation partly in section of a wheel body composed of sheet metal spokes constructed in accordance with my invention; Fig. 2 is a plan view of the blank from which the spokes are made; Fig. 3 is a plan view showing the manner of making the individual spokes from the blank; and Fig. 4 is a detail perspective view of the finished spoke.

Referring to the drawings, A indicates a metallic hub and B a sheet metal felly or fixed rim preferably of the channelled type and connecting the hub and the sheet metal felly are the sheet metal or strip spokes C, any desired number of spokes being employed according to the nature of the wheel to be constructed. These spokes C are of strip or sheet metal tapered or mitered at their inner ends as shown at D in order that they may be assembled about the hub, and at their outer ends each spoke is formed with a shank or spindle portion E which is adapted to be projected through an opening produced in the base or bottom of the metallic felly or fixed rim and the end of this spindle or shank portion E is threaded as shown at E' in order to receive the tensioning or the fastening nut F.

In practice it is preferred in punching the holes in the sheet metal felly to carry the metal outwardly providing a reinforcement at this point and the spoke is also provided with a filletted portion $E^2$ which fits into the rounded drawnout portion of the metallic felly.

The tapered or mitered ends of the spokes can be bent at any desired angle in case said spokes are to be arranged at an angle to the plane of the wheel and the hub flanges will of course be similarly inclined. The tapered or mitered ends D are also preferably formed with a groove or corrugation D' to receive or fit a correspondingly shaped projecting portion on the hub flange and then a flange ring $A^2$ may be employed to contact with these tapered or mitered ends of the spokes and this ring flange may be made with a corresponding corrugation or it may be plain as preferred. When the inner end of the spoke is formed with a groove or corrugation and is brought into mating engagement with a corresponding projection or engaging portion upon the hub flange and securely fixed to said flange, the spoke end will be rigidly connected to the hub flange and held against movement and consequently the spokes although constructed of comparatively thin sheet metal will be able to withstand the torque strains to which the spokes are subjected. Furthermore the spokes being arranged with their flat faces substantially parallel with the plane of the wheel and securely fastened at their inner ends to the hub and at their outer ends to the sheet metal felly, an exceedingly strong and durable metal wheel is provided which will be very light.

With the object of economy and also simplicity and rapidity of manufacture I prefer to make the spokes in the form of a continuous strip as shown in Fig. 2, the inner portions of adjacent strips being united and the shank or spindle portion also united and the continuous strip or blank comprising a series of spokes can be divided at the proper points to provide the separate and individual spokes and in Fig. 2 the body portions of the spokes are designated at C and the connecting spindle portions at E. In Fig. 3 it will be noted that the blank has been subdivided into separate spokes and at the same time that the body portions are separated they are also tapered or mitered as shown at D and this can be done all in one operation or in a series of operations if preferred and the spindle portions are also separated as most clearly shown. The corrugating or grooving of the mitered ends of the spokes can be accomplished either at the same time the blank is divided or at a subsequent period. The bolt opening can be arranged either centrally or at the edge of the mitered end as preferred.

It will thus be seen that I provide a strong and durable sheet metal spoke capable of being quickly and easily built into a wheel and that I also provide a simple and inexpensive method for making said spokes.

Having thus described my invention, what I claim is:

The method of making sheet metal spokes which consists in providing a blank comprising alternate flat and spindle portions of definite lengths, dividing said flat and spindle portions at substantially their transverse central lines, threading the spindle ends of the spokes, tapering the flat ends of the spokes, forming a transverse groove in the flat tapered end of each spoke and providing a perforation in said groove.

In testimony whereof, I hereunto affix my signature.

JAMES H. WAGENHORST.